United States Patent
Kim et al.

(10) Patent No.: US 7,452,413 B2
(45) Date of Patent: Nov. 18, 2008

(54) INK COMPOSITION, INK CARTRIDGE INCLUDING THE SAME, AND INKJET RECORDING APPARATUS COMPRISING THE INK CARTRIDGE

(75) Inventors: In-hye Kim, Seoul (KR); Jong-in Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/003,196

(22) Filed: Dec. 20, 2007

(65) Prior Publication Data

US 2008/0202379 A1 Aug. 28, 2008

(30) Foreign Application Priority Data

Feb. 23, 2007 (KR) .................. 10-2007-0018516

(51) Int. Cl.
- *C09D 11/00* (2006.01)
- *C09D 11/02* (2006.01)
- *B41J 2/01* (2006.01)

(52) U.S. Cl. .................. 106/31.43; 106/31.75

(58) Field of Classification Search .............. 106/31.43, 106/31.75; 347/100
See application file for complete search history.

(56) References Cited

U.S. PATENT DOCUMENTS

| | | | | |
|---|---|---|---|---|
| 4,012,334 | A * | 3/1977 | Raleigh et al. | 516/119 |
| 5,486,549 | A * | 1/1996 | Itagaki et al. | 106/31.58 |
| 5,877,235 | A * | 3/1999 | Sakuma et al. | 106/31.58 |
| 6,113,680 | A * | 9/2000 | Aoyama et al. | 106/31.86 |
| 6,858,663 | B2 * | 2/2005 | Knott et al. | 524/266 |
| 2006/0219133 | A1 * | 10/2006 | Sakamoto et al. | 106/31.65 |

* cited by examiner

*Primary Examiner*—Helene Klemanski
(74) *Attorney, Agent, or Firm*—Roylance, Abrams, Berdo & Goodman, L.L.P.

(57) ABSTRACT

An ink composition is provided including a colorant, a solvent, and a disilazane-based compound. An ink cartridge including the ink composition, and an inkjet recording apparatus including the ink cartridge are also provided by the invention. The ink composition can suppress formation of bubbles in the ink cartridge during the printing operation of an inkjet printer, can rapidly remove bubbles once formed, and can demonstrate stability in an initial ejection performance of the ink by activated ink fluidity.

15 Claims, 2 Drawing Sheets

INK COMPOSITION, INK CARTRIDGE INCLUDING THE SAME, AND INKJET RECORDING APPARATUS COMPRISING THE INK CARTRIDGE

CROSS-REFERENCE TO RELATED PATENT APPLICATION

This application claims the priority of Korean Patent Application No. 10-2007-0018516, filed on Feb. 23, 2007, in the Korean Intellectual Property Office, the disclosure of which is hereby incorporated by reference in its entirety.

BACKGROUND OF THE INVENTION

1. Field of the Invention

The present invention relates to an ink composition comprising a disilazane-based compound, a colorant and a solvent, an ink cartridge including the ink composition, and an inkjet recording apparatus including the ink cartridge. More particularly, the invention relates to an ink composition comprising a disilazane-based compound, which can suppress formation of bubbles in an ink cartridge during the operation of an inkjet printer, can rapidly remove bubbles once formed, and can demonstrate stability in an initial ejection performance of the ink by activated ink fluidity, an ink cartridge including the ink composition, and an inkjet recording apparatus including the ink cartridge.

2. Description of the Related Art

Due to the recent demand for colored hard copy prints in the field of image processing, various methods of creating colored hard copy prints are being tried. Examples of such methods include a dye sublimation recording method, a thermal wax transfer recording method, an inkjet recording method, an electrophotography recording method, a thermally processed silver salt recording method, and the like.

In inkjet printing, characters and images are recorded by ejecting ink bubbles onto a recording medium, such as a sheet of paper, from a nozzle in a recording head of an inkjet printer to form a point referred to as a "dot." Inkjet printing has several advantages compared to other technologies, such as low cost, high print quality, easy formability of color images, and so on.

Accordingly, in recent years there has been the widespread use of inkjet printers that allow simplified, high-quality printing in homes and offices to obtain prints comparable to a silver salt photograph by ink-jet printing.

Inks used in inkjet printing are prepared by dissolving or dispersing a water-soluble dye or pigment in a solvent containing water and an aqueous organic solvent. If necessary, additives, such as a surfactant, or the like, may be added to the resultant product.

In order for liquid inks used in inkjet printing to provide high-quality printing for a sustained time period, the inks are required to have optimized properties such as viscosity, surface tension and density. In addition, the inks must not clog nozzle openings of inkjet printers; must not form precipitates due to heat; and must have excellent print image characteristics, such as excellent water resistance, light resistance, and so on, without changing physical properties of the inks.

In addition, when ink is stored in an inkjet system using a large ink tank for a long period of time, foam can be generated in the ink. In this case, it is necessary to remove the foam by inserting an ink circulation system into a print cartridge, which, however, is quite difficult. Accordingly, it is highly desirable to remove the foam generated in the ink in an easy and efficient manner. Also, there exists a need for suppressing generation of foam in the ink.

Prior art ink compositions are prone to bubble formation due to the presence of a surfactant, and the above-described requirements of ink compositions may not be satisfied.

To overcome these problems with prior art ink compositions, Japanese Patent No. 3,078,184, for example, describes a technique in which a fluorine- or silicon-based polymer is added to an ink composition.

Such a fluorine- or silicon-based polymer, however, has poor solubility in ink, so that it requires an ancillary solvent capable of facilitating dispersion or dissolution. Further, these additives, that is, the ancillary solvent and the fluorine- or silicon-based polymer, have poor miscibility with water-soluble additive(s) of the basic ink, and layer separation and hardening of ink may readily occur when they are used in the ink composition. When ink is left for a long period without use, the silicon-based polymer of the surfactant in the ink accelerates drying of the ink in air. Once the ink is dried, the viscosity of the ink is rapidly increased, which causes nozzle clogging due to hardening of the ink on a nozzle surface of a printhead.

Unfortunately, no ink compositions have, to date, proven to be very satisfactory in suppressing formation of bubbles in an ink cartridge, rapidly removing bubbles once formed and demonstrating stability in an initial ejection performance of the ink.

SUMMARY OF THE INVENTION

The present invention provides an ink composition comprising a disilazane-based compound, which can suppress formation of bubbles in an ink cartridge during the operation of an inkjet printer. The invention is also directed to an ink composition which can rapidly remove bubbles once formed, and can demonstrate stability in an initial ejection performance of the ink by activated ink fluidity.

The present invention also provides an ink set comprising two or more kinds of the ink composition.

The present invention also provides an ink cartridge for an inkjet recording apparatus comprising the ink set.

Furthermore, the present invention provides an inkjet recording apparatus comprising the ink cartridge.

According to an aspect of the present invention, an ink composition is provided comprising a colorant, a solvent, and a disilazane-based compound represented by the following formula (1):

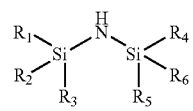

(1)

where each of $R_1$ through $R_6$ independently represents a hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ heteroalkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxy group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroaryloxy group, a substituted or unsubstituted $C_6$-$C_{20}$ heteroarylalkenyl group, a substituted or unsubstituted $C_3$-$C_{20}$ heteroarylalkenyl group, a substituted or unsubstituted $C_3$-$C_{20}$ cycloalkyl group, or a substituted or unsubstituted $C_3$-$C_{20}$ heterocycloalkyl group.

According to another aspect of the present invention, an ink set is provided comprising two or more kinds of the ink composition.

According to still another aspect of the present invention, an ink cartridge for an inkjet recording apparatus is provided comprising the ink set.

According to a further aspect of the present invention, an inkjet recording apparatus is provided comprising the ink cartridge.

These and other aspects of the invention will become apparent from the following detailed description of the invention which discloses various embodiments of the invention.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
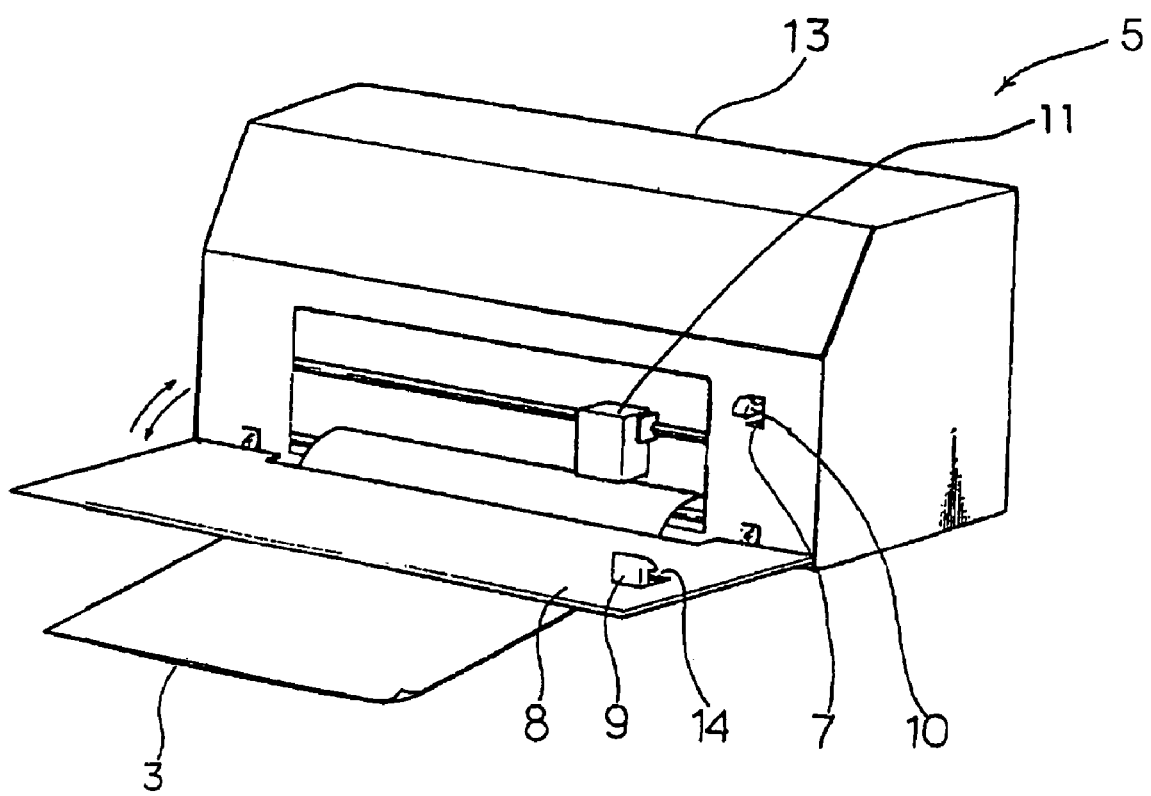
FIG. 1 is a perspective view of an inkjet recording apparatus including an ink cartridge, according to an embodiment of the present invention.

The present invention provides an ink composition including a disilazane-based compound, which can suppress formation of bubbles in an ink cartridge during the operation of an inkjet printer. The invention is also directed to an ink composition that can rapidly remove bubbles once formed, and can demonstrate stability in an initial ejection performance of the ink by activated ink fluidity.

Hereinafter, the present invention will be described in more detail.

The present invention provides an ink composition comprising a colorant, a solvent, and a disilazane-based compound represented by Formula 1 as follows:

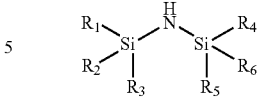

Formula 1 where each of $R_1$ through $R_6$ independently represents a hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ heteroalkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxy group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroaryloxy group, a substituted or unsubstituted $C_6$-$C_{20}$ heteroarylalkenyl group, a substituted or unsubstituted $C_3$-$C_{20}$ heteroarylalkenyl group, a substituted or unsubstituted $C_3$-$C_{20}$ cycloalkyl group, or a substituted or unsubstituted $C_3$-$C_{20}$ heterocycloalkyl group.

In general, bubbles (or foam) are liable to form in an ink composition due to fluidity. A surfactant added to the ink composition stabilizes the thus-formed bubbles which prevents the bubbles from being easily removed.

Meanwhile, the ink composition according to the present invention comprises a disilazane-based compound having a tetrahedral structure containing two silicon (Si) atoms at opposite sides, as represented by Formula 1 above. The tetrahedral structure easily capable of breaking a film formed by the stabilized bubbles and exhibiting much higher solubility than a conventional silicone or silicon-based polymeric defoaming agent. Accordingly, the ink composition according to the present invention suppresses bubble formation in an ink composition and can rapidly remove bubbles from the ink composition, thereby contributing to improved defoamability.

Examples of the disilazane-based compound represented by Formula 1 above that can be used in the ink composition according to the present invention include, but are not limited to, hexamethyl disilazane (HMDS) represented by the Formula 2 below, 1,3-dibutyl-1,1,3,3-tetramethyl disilazane represented by Formula 3 below, 1,3-di-N-octyltetramethyl disilazane represented by Formula 4 below, 1,1,3,3-tetramethyl disilazane represented by Formula 5 below, 1,3-bis(chloromethyl)tetramethyl disilazane represented by Formula 6 below, 1,3-bis(3,3,3-trifluoropropyl)tetramethyl disilazane represented by Formula 7 below, 1,3-dipropyl-1,1,3,3-tetramethyl disilazane represented by Formula 8 below, and mixtures thereof:

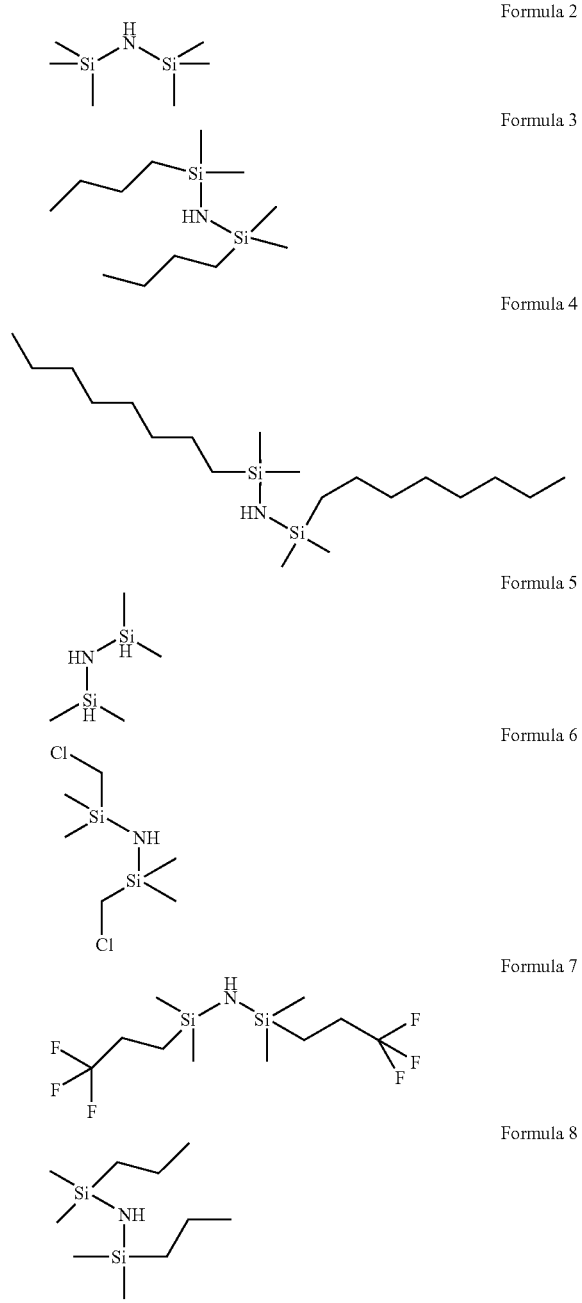

Formula 2

Formula 3

Formula 4

Formula 5

Formula 6

Formula 7

Formula 8

In the ink composition according to the present invention, the content of the disilazane-based compound is about 0.01 to about 10 parts by weight, preferably about 0.1 to about 5 parts by weight, and more preferably 0.1 to 5 parts by weight, based on 100 parts by weight of the ink composition. The disilazane-based compound is included in an amount effective to suppress foaming and bubble formation during the printing operation. In one embodiment, the disilazane is included in an amount of about 0.001 to 10 parts by weight, and preferably about 0.1 to 5 parts by weight based on 100 parts by weight of the ink composition.

When the content of the disilazane-based compound is less than 0.01 parts by weight based on 100 parts by weight of the ink composition, defoamability of the ink may not be satisfactory and initial performance of the ink when introduced into an ink passage may not be good. When the content of the disilazane-based compound is greater than 10 parts by weight based on 100 parts by weight of the ink composition, penetrability of the ink into a recording sheet is overly high, so that the ink penetrates into the recording sheet too quickly even to the opposite surface of the recording sheet, resulting in smearing, and extreme wetting of a portion in proximity to nozzles. Consequently, the stability of the ejection performance of ink nozzles cannot be ensured.

The colorant used in the present invention is not limited. For example, the colorant may be a water-soluble or dispersible dye, a pigment that can be used with a dispersing agent to be stably dispersed in water, a self-dispersible pigment that can be stably dispersed in water without a dispersible agent, or mixtures thereof.

The dispersible dye may be a dye selected from Food Black Dyes, Food Red Dyes, Food Yellow Dyes, Food Blue Dyes, Acid Black Dyes, Acid Red Dyes, Acid Blue Dyes, Acid Yellow Dyes, Direct Black Dyes, Direct Blue Dyes, Direct Yellow Dyes, anthraquinone dyes, monoazo dyes, disazo dyes, phthalocyanine derivatives, and similar materials. Specific examples of the pigment include carbon black, graphite, vitreous carbon, activated charcoal, activated carbon, anthraquinone, pthalocyanine blue, pthalocyanine green, diazos, monoazos, pyranthrones, perylene, quinacridone, indigoid pigments, and similar materials. The self-dispersible pigment may be selected from cabojet-series, CW-series of orient chemical and similar materials. However, the colorant is not limited to these compounds.

The content of the coloring agent contained in the ink composition may be in a range of about 0.5 to about 10 parts by weight, preferably about 1 to about 7 parts by weight, and more preferably about 3 to about 5 parts by weight, based on 100 parts by weight of the ink composition. When the content of the colorant is less than about 0.5 parts by weight based on 100 parts by weight of the ink composition, the content of the colorant is too small to provide color. On the other hand, when the amount of the colorant is greater than about 10 parts by weight based on 100 parts by weight of the ink composition, the solubility of the ink may be reduced, thus undesirably hardening the ink.

The solvent used in the ink composition according to the present invention may be an aqueous solvent such as water. The ink composition according to the present invention may further comprise one or more kinds of organic solvents. The content of the solvent may be in the range of about 80 to about 99 parts by weight, and preferably about 85 to about 95 parts by weight, based on 100 parts by weight of the ink composition.

When the content of the solvent is less than 80 parts by weight based on 100 parts by weight of the ink composition, the viscosity of the ink composition is excessively increased, so that the ejection performance of the ink may be reduced. When the content of the solvent is greater than 99 parts by weight based on 100 parts by weight of the ink composition, the surface tension of the ink is considerably increased, thereby undesirably lowering the ejection performance of the ink.

In the ink composition according to the present invention, the solvent may include one or more organic solvents selected from the group consisting of the monohydric alcohol solvents, ketone-based solvents, ester-based solvents, polyalcohol based solvents, nitrogen-containing compound based solvents, and sulfur-containing compound based solvents.

Specifically, examples of the monohydric alcohol solvents include methyl alcohol, ethyl alcohol, n-propyl alcohol, isopropyl alcohol, n-butyl alcohol, sec-butyl alcohol, t-butyl alcohol, and isobutyl alcohol. Examples of the ketone-based solvents include acetone, methylethyl ketone, diethyl ketone, and diacetone alcohol. Examples of the ester-based solvents include methyl acetate, ethyl acetate, and ethyl lactate. Examples of the polyalcohol-based solvents include ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate, and trimethylolpropane ethoxylate. In the present invention, addition of the monohydric alcohol based solvent as the organic solvent may offer several advantages and effects, including penetrability into recording media such as normal recording sheets or special recording sheets, by controlling the surface tension of the ink, dot forming capability, increased drying property of images printed, and others. The polyalcohol-based solvents and derivatives thereof do not readily evaporate and lower the freezing point of ink, thereby improving storage stability of the ink and ultimately preventing nozzle clogging.

Examples of the nitrogen-containing compound based solvents include 2-pyrolidone, and N-methyl-2-pyrolidone. Examples of the sulfur-containing compound based solvents include dimethyl sulfoxide, tetramethylenesulfone, and thioglycol.

If an aqueous solvent such as water is used together with the organic solvent, the content of the organic solvent is about 0.1 to about 130 parts by weight, and preferably 10 to 50 parts by weight, based on 100 parts by weight of the aqueous solvent. When the content of the organic solvent is less than about 0.1 parts by weight based on 100 parts by weight of the aqueous solvent, the ink is evaporated too quickly, which may impair storage stability of the ink. When the content of the organic solvent is greater than about 130 parts by weight based on 100 parts by weight of the aqueous solvent, the viscosity of the ink composition is excessively increased, so that the ejection performance of the ink may undesirably deteriorate.

In order to achieve enhanced characteristics, the ink composition may further comprise various additives. Such additives may include at least one selected from the group consisting of a wetting agent, a dispersant, a surfactant, a viscosity modifier, a pH controller, and an anti-oxidant. The content of the at least one additive is about 0.5 to about 600 parts by weight, preferably 5 to 300 parts by weight, and more preferably 10 to 100 parts by weight, based on 100 parts by weight of the colorant. When the content of the at least one additive is less than about 0.5 parts by weight based on 100 parts by weight of the colorant, performance of the ink composition is not properly exhibited. When the content of the at least one additive is greater than about 600 parts by weight based on 100 parts by weight of the colorant, storage stability of the ink composition may undesirably deteriorate.

The surfactant is not particularly limited, and may be appropriately selected according to purpose. For example, the surfactant may be an amphoteric surfactant, an anionic surfactant, a cationic surfactant, or a nonionic surfactant, which may be used alone or in a combination.

Examples of the amphoteric surfactant include alanine, dodecyldi(aminoethyl)glycine, di(octylaminoethyl)glycine; and N-alkyl-N,N-dimethylammoniumbetaine.

Examples of the anionic surfactant include alkylbenzenesulfonic acid salts, α-olefin sulfonic acid salts and phosphoric acid esters.

Examples of the cationic surfactant include amine salts, e.g., alkyl amine salts, amino-alcohol derivatives with fatty acids, polyamine derivatives with fatty acids and imidazoline; and quaternary ammonium type surfactants, e.g., alkyltrimethylammonium salts, dialkyldimethylammonium salts, alkyldimethylbenzyl ammonium salts, pyridinium salts, alkylisoquinolium salts, alkyldimethylammonium salts and benzethonium chloride.

Examples of the nonionic surfactant include a polyoxyethylenealkylether surfactant, polyoxyethylenealkylphenylether surfactant, and an acetyleneglycol surfactant.

Of these surfactants, the nonionic surfactant is particularly preferred in view of excellent defoamability.

Preferred nonionic surfactants include Surfynol series surfactants having acetylenic ethoxylated diols (available from Air Products Corp.), Tergitol series surfactants having polyethylene oxides or polypropylene oxides (available from Union Carbide), and Tween series surfactants having polyoxyethylene sorbitan fatty acid esters.

In order for the ink composition according to the present invention to demonstrate optimized performance when used, the ink composition may have a surface tension of about 15-70 dyne/cm, and preferably about 25-55 dyne/cm, and a viscosity of about 1.0-20 cps, and preferably about 1.5-3.5 cps, at 20° C. When the surface tension of the ink composition is outside the above range, printing performance may deteriorate. When the viscosity of the ink composition is outside the above range, ejection performance of the ink is not good.

An ink set according to the present invention comprises two or more different kinds of the above-described ink composition. The ink set may be supplied to an ink receiving unit of an inkjet recording apparatus or an ink cartridge of an inkjet printer. An inkjet recording apparatus according to the present invention may include a thermal head which discharges ink droplets due to steam generated by heating the ink composition according to the present invention, a piezo head which discharges ink droplets using a piezo unit, a disposable head, or a permanent head. Further, the inkjet recording apparatus according to the present invention may be a scanning-type printer or an array-type printer. The inkjet recording apparatus according to the present invention may be used for a desktop, a textile, or for an industrial purpose.

The types of head and the types and applications of printer described above are intended to explain the inkjet recording apparatus according to the present invention in more detail. The ink set according to the present invention may be used in a variety of inkjet recording apparatuses.

Definitions of the substituents used in the present invention are provided below.

The alkyl group used in the present invention refers to a straight or branched chain hydrocarbon radical containing a saturated carbon chain and having 1 to 20 carbon atoms, preferably 1 to 10 carbon atoms, and more preferably 1 to 6 carbon atoms. Examples of substituted or unsubstituted alkyl groups used in the present invention are methyl, ethyl, propyl, isobutyl, sec-butyl, tert-butyl, pentyl, iso-amyl, hexyl, and the like. More than one hydrogen atom in these alkyl groups may be replaced with a halogen atom, a hydroxy group, a nitro group, a cyano group, a substituted or unsubstituted amino group such as —$NH_2$, —NH(R) or —N(R')(R''), R' and R'' each independently being an alkyl group with 1 to 10 carbon atoms, an amidino group, a hydrazine, a hydrazone, a carboxyl group, a sulfonic acid group, a phosphoric acid, an alkyl group with 1 to 20 carbon atoms, a halogenated alkyl group with 1 to 20 carbon atoms, an alkenyl group with 2 to 20 carbon atoms, an alkynyl group with 2 to 20 carbon atoms, a hetroalkyl group with 1 to 20 carbon atoms, an aryl group with 6 to 20 carbon atoms, an arylalkyl group with 6 to 20 carbon atoms, a heteroaryl group with 6 to 20 carbon atoms, and a heteroarylalkyl group with 6 to 20 carbon atoms.

The heteroalkyl group used in the present invention refers to the alkyl group defined above containing one or more carbon atoms, preferably, 1 to 5 carbon atoms, in its main chain nitrogen, replaced with sulfur, oxygen or a phosphorus atom.

The alkenyl group used in the present invention refers to a substituted or unsubstituted monovalent hydrocarbon radical of 2 to 20 carbon atoms, preferably 2 to 10 carbon atoms, and more preferably 2 to 6 carbon atoms, containing at least one carbon-carbon double bond. The alkenyl may be combined with each other through a carbon atom containing the at least one carbon-carbon double bond or saturated carbon atom. The alkenyl group may be randomly substituted with one or more halogen substituents. Examples of the alkenyl group include ethenyl, 1-propenyl, 2-propenyl, 2-butenyl, 3-butenyl, pentenyl, 5-hexenyl, dodecenyl and the like.

The aryl group used in the present invention refers to a monovalent monocyclic, bicyclic or tricyclic aromatic hydrocarbon radical of 6 to 30 ring atoms, preferably 6 to 18 ring atoms, and may be arbitrarily substituted with one or more halogen substituents. The aromatic radical in the aryl group contains only carbon atoms. Examples of the aryl group include phenyl, naphthyl, anthryl and the like. One or more hydrogen atoms in the aryl group may be substituted with the substituents mentioned in connection with the alkyl group.

The heteroaryl group used in the present invention refers to an aromatic ring system having 6 to 30 ring atoms, containing one, two or three hetero atoms selected from N, O, or S, the remaining ring atoms being C, in which the rings may be attached to each other or fused using a pendant method. One or more hydrogen atoms in the aryl group may be substituted with the substituents mentioned in connection with the alkyl group.

The alkoxy group used in the present invention refers to a radical of —O-alkyl, in which the alkyl is as defined above. Examples of the alkoxy group include methoxy, ethoxy, propoxy, isobutyloxy, sec-butyloxy, pentyloxy, iso-amyloxy, hexyloxy, etc. At least one hydrogen atom of the alkoxy group can be substituted with the substituents of the alkyl group.

The heteroalkoxy group used in the present invention refers to the alkoxy group in which at least one, for example, oxygen, sulfur, or nitrogen is present in an alkyl chain, and examples thereof include $CH_3CH_2OCH_2CH_2O—$, $C_4H_9OCH_2CH_2OCH_2CH_2O—$ and $CH_3O(CH_2CH_2O)_nH$.

The arylalkyl group used in the present invention refers to the aryl group in which some hydrogen atoms are substituted with lower alkyl radicals, for example, methyl, ethyl, and propyl. Examples of the arylalkyl group include benzyl and phenylethyl. At least one hydrogen atom of the arylalkyl group can be substituted with the substituents of the alkyl group.

The heteroarylalkyl group used in the present invention refers to the heteroaryl group in which some hydrogen atoms are substituted with lower alkyl groups. At least one hydrogen atom of the heteroarylalkyl group can be substituted with the substituents of the alkyl group.

The aryloxy group used in the present invention refers to a radical of —O-aryl, in which the aryl is as defined above. Examples of the aryloxy group include phenoxy, naphthoxy, anthracenyloxy, phenanthrenyloxy, fluorenyloxy, and indenyloxy. At least one hydrogen atom of the aryloxy group can be substituted with the same substituents as in the alkyl group.

The heteroaryloxy group used in the present invention refers to a radical of —O-heteroaryl, in which the heteroaryl is as defined above. Examples of the heteroaryloxy group include benzyloxy and phenylethyloxy. At least one hydrogen atom of the heteroaryloxy group can be substituted with the substituents of the alkyl group.

The cycloalkyl group used in the present invention refers to a monovalent monocyclic system having 5-30 carbon atoms. At least one hydrogen atom of the cycloalkyl group can be substituted with the substituents of the alkyl group.

The heterocycloalkyl group used in the present invention refers to a monovalent monocyclic system including 1, 2, or 3 hetero atoms, preferably N, O, P, and S and having 5-30 ring members. At least one hydrogen atom of the cycloalkyl group can be substituted with the substituents of the alkyl group.

FIG. 1 is a perspective view illustrating an inkjet recording apparatus including an ink cartridge, according to an embodiment of the present invention.

Referring to FIG. 1, the inkjet recording apparatus 5 according to the current embodiment of the present invention includes an ink cartridge 11 including an ink composition comprising a colorant containing a macromolecular chromophoric group, and an additive similar to the colorant. A printer cover 8 is connected with a main body 13 of the inkjet recording apparatus 5. A portion of a moving latch 10 protrudes through a hole 7 in the main body 13 of the inkjet recording apparatus. The moving latch 10 is engaged with a fixed latch 9 which is connected to an inside surface of the printer cover 8 when the printer cover 8 is closed. The printer cover 8 has a recess 14 that corresponds to the portion of the moving latch 10 protruding through the hole 7. The ink cartridge 11 is mounted in the main body 13 and ink is ejected onto a piece of paper 3 that is transferred under a lower part of the ink cartridge 11.

Figure 2:
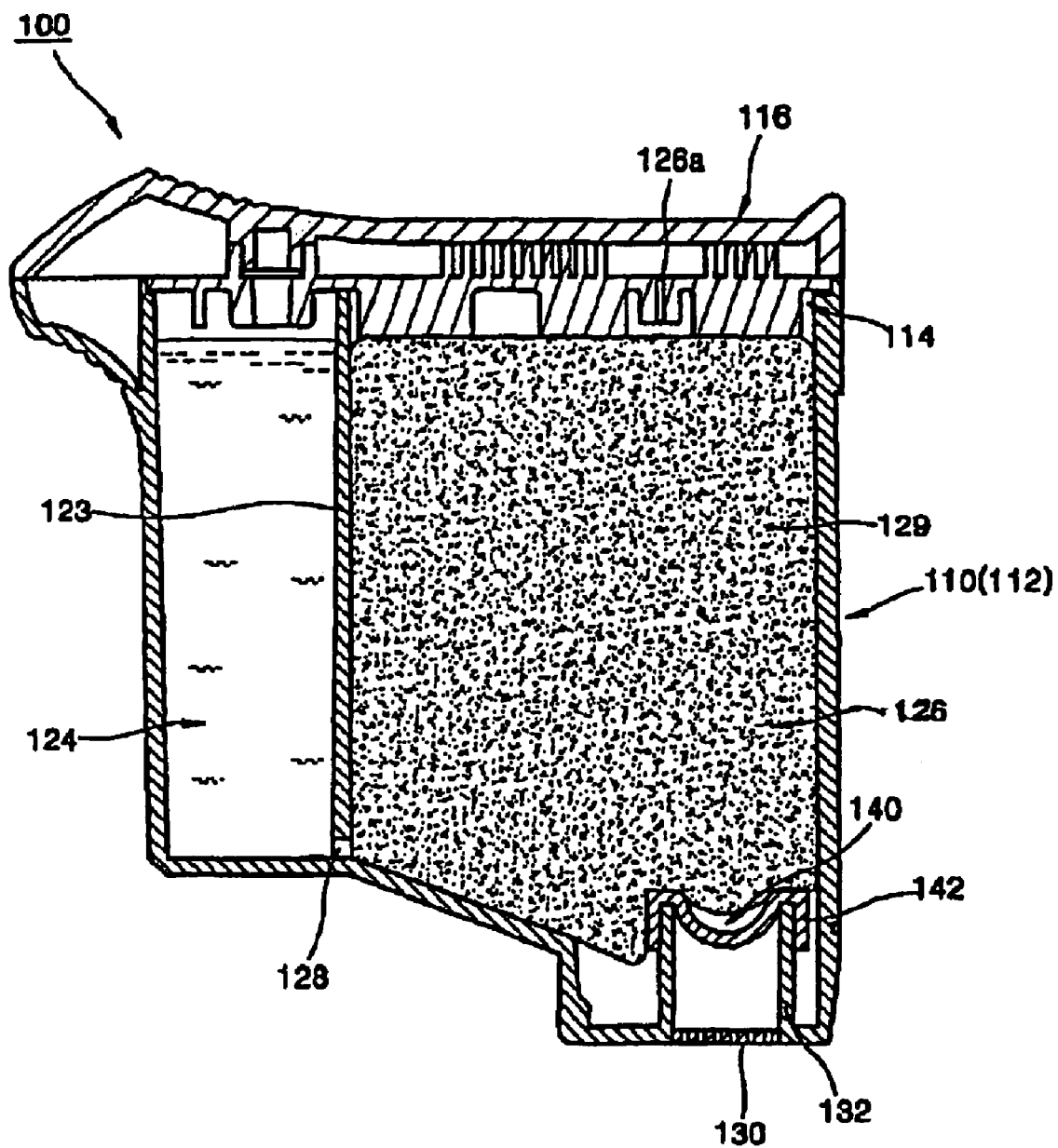
FIG. 2 is a vertical sectional view of an ink cartridge according to an embodiment of the present invention.

FIG. 2 is a vertical sectional view of an ink cartridge 100 including an ink set, according to an embodiment of the present invention. Referring to FIG. 2, the ink cartridge 100 according to the current embodiment of the present invention includes a main body 110 comprising an ink receiver 112. The ink cartridge 100 also includes an inner cover 114 to cover a top region of the ink receiver 112, and an outer cover 116 spaced apart from the inner cover 114 by a predetermined distance to seal the ink receiver 112 and the inner cover 114.

The ink receiver 112 is divided into a first chamber 124 and a second chamber 126 by a vertical barrier wall 123. An ink passage 128 is formed at a lower part of the vertical barrier wall 123 between the first chamber 124 and the second chamber 126. The ink is filled into the first chamber 124 and a sponge 129 disposed in the first chamber 124, and then the second chamber 126. A vent hole 126a corresponding to the second chamber 126 is formed in the inner cover 114.

A filter 140 to prevent an ejection hole of a printer head 130 from clogging is formed in a lower part of the second chamber 126 to filter impurities and minute bubbles. A hook 142 is formed in an edge region of the filter 140 and is coupled to a top region of a standpipe 132. The ink in the ink receiver 112 passes through the ejection hole of the printer head 130 and is ejected as small droplets onto a printing or recording medium (e.g., paper or a general sheet).

The present invention will be described in greater detail with reference to the following examples. The following examples are for illustrative purposes only and are not intended to limit the scope of the present invention.

<Preparation of Ink Compositions>

Ink compositions were prepared by employing the following compositions, each including various ingredients of a disilazane-based compound, a colorant, water, an organic solvent, an additive and the like. The ingredients were mixed to yield a mixture, which was then stirred in a stirrer for 30 minutes or longer until the mixture reached a homogeneous state. Finally, the mixture was filtered through a 0.45 μm (micrometer) filter to obtain ink compositions according to Examples 1-4 below.

EXAMPLE 1

| | |
|---|---|
| Carbon Black (FW18, Degussa) | 5 parts by weight |
| Glycerol | 2 parts by weight |
| Diethylene glycol | 3 parts by weight |
| Compound of Formula 2 | 3 parts by weight |
| Water (DI water) | 87 parts by weight |
| Non-ionic surfactant (Tween 40, Aldrich) | 0.6 parts by weight |

EXAMPLE 2

| | |
|---|---|
| Carbon Black (Raven 5250, Columbian Co.) | 5 parts by weight |
| Glycerol | 3 parts by weight |
| Diethylene glycol | 2 parts by weight |
| Ethylene glycol | 2 parts by weight |
| Compound of Formula 3 | 3 parts by weight |
| Water (DI water) | 85 parts by weight |
| Non-ionic surfactant (Tween 40, Aldrich) | 0.6 parts by weight |

EXAMPLE 3

| | |
|---|---|
| Carbon Black (Regal 330, Cabot Co.) | 5 parts by weight |
| Diethylene glycol | 3 parts by weight |
| Ethylene glycol | 4 parts by weight |
| Compound of Formula 4 | 3 parts by weight |
| Water (DI water) | 85 parts by weight |
| Non-ionic surfactant (Tween 40, Aldrich) | 0.6 parts by weight |

EXAMPLE 4

| | |
|---|---|
| Carbon Black (Regal 330, Cabot Co.) | 5 parts by weight |
| Diethylene glycol | 3 parts by weight |
| Ethylene glycol | 4 parts by weight |
| Compound of Formula 5 | 3 parts by weight |
| Water (DI water) | 85 parts by weight |
| Non-ionic surfactant (Tween 40, Aldrich) | 0.6 parts by weight |

COMPARATIVE EXAMPLE 1

An ink composition was prepared under the same conditions as in Example 1, except that the compound of Formula 2 was not used.

COMPARATIVE EXAMPLE 2

An ink composition was prepared under the same conditions as in Example 2, except that the compound of Formula 3 was not used.

COMPARATIVE EXAMPLE 3

An ink composition was prepared under the same conditions as in Example 3, except that the compound of Formula 4 was not used.

COMPARATIVE EXAMPLE 4

An ink composition was prepared under the same conditions as in Example 4, except that the compound of Formula 5 was not used.

COMPARATIVE EXAMPLE 5

An ink composition was prepared under the same conditions as in Example 3, except that, instead of the compound of Formula 4, dimethylpolysiloxane was used.

<Defoamability Test>

In order to examine the extent of formation of bubbles in ink, about 5 mls (milliliters) of each of the ink compositions obtained in Examples 1-4 and Comparative Examples 1-5 were placed in a vial with a stirring bar. Then, the vial was violently stirred for 5 minutes. The heights of the resulting foams were measured immediately and 30 seconds after stirring the vial, and then height ratios of the ink compositions to the foams were obtained for comparison.

H=(Height of foam formed 30 seconds after stirring)/(Height of foam formed immediately after stirring)*100(%)

TABLE 1

| | Example | | | | Comparative Example | | | | |
|---|---|---|---|---|---|---|---|---|---|
| | 1 | 2 | 3 | 4 | 1 | 2 | 3 | 4 | 5 |
| Evaluation | ○ | ○ | ○ | ○ | Δ | X | Δ | X | Δ |

○: $0 \leq H \leq 20$
Δ: $20 < H \leq 50$
X: $50 < H$

As is obvious from Table 1, inks containing disilazane-based compounds according to the present invention demonstrate excellent defoamability.

<Ejection Stability Test>

The ink compositions obtained in Examples 1-4 and Comparative Examples 1-5 were filled in ink cartridges (obtained from Samsung Co., Ltd.) and allowed to stand undisturbed at room temperature (25° C.) and at a relatively low temperature (0° C.) each for 2 weeks before printing. Storage stability (E) was evaluated by determining how many nozzles were unable to eject ink due to clogging after the nozzles were cleaned three times, as indicated in percentages in the following relationship, and the results are illustrated in Table 2 below, according to the following evaluation criteria:

TABLE 2

| | Example | | | | Comparative Example | | | | |
|---|---|---|---|---|---|---|---|---|---|
| | 1 | 2 | 3 | 4 | 1 | 2 | 3 | 4 | 5 |
| Evaluation (Room Temp.) | ○ | ○ | ○ | ○ | ○ | Δ | X | Δ | Δ |

TABLE 2-continued

| | Example | | | | Comparative Example | | | | |
|---|---|---|---|---|---|---|---|---|---|
| | 1 | 2 | 3 | 4 | 1 | 2 | 3 | 4 | 5 |
| Evaluation (Low Temp.) | ○ | ○ | ○ | ○ | Δ | X | X | Δ | X |

○: E < 90%
Δ: 70 ≦ < 90%
X: E < 70%

As is obvious from Table 2, the inks containing disilazane-based compounds according to the present invention had an ejection performance ratio of over 90% without nozzle clogging, providing improved storage stability.

<Image Test>

The ink compositions according to Examples 1-4 and Comparative Examples 1-5 were refilled in ink C-60 cartridges (obtained from Samsung Co., Ltd.) to print images having monochromatic characters without background images using a printer (MJC-3300p, obtained from Samsung Co., Ltd.).

TABLE 3

| | Example | | | | Comparative Example | | | | |
|---|---|---|---|---|---|---|---|---|---|
| | 1 | 2 | 3 | 4 | 1 | 2 | 3 | 4 | 5 |
| Evaluation | ○ | ○ | ○ | ○ | Δ | Δ | X | Δ | Δ |

○: No smearing of images occurrred and characters were definitely legible.
Δ: Characters were legible while images slightly smeared
X: Smearing occurred and characters were illegible.

As is obvious from Table 3, the inks containing disilazane-based compounds according to the present invention can suppress bubble formation by reducing fluidity of colorants and improving adherence of colorants to paper and reducing smearing between colors in printed images.

As described above, the present invention provides an ink composition including a disilazane-based compound, which can suppress formation of bubbles in an ink cartridge during the operation of an inkjet printer, can rapidly remove bubbles once formed, and can demonstrate stability in an initial ejection performance of the ink by activated ink fluidity.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ink composition comprising a colorant, a solvent, and a disilazane-based compound represented by Formula 1 as follows:

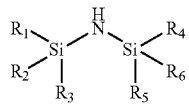

Formula 1 where each of $R_1$ through $R_6$ independently represents a hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ heteroalkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxy group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroaryloxy group, a substituted or unsubstituted $C_6$-$C_{20}$ heteroarylalkenyl group, a substituted or unsubstituted $C_3$-$C_{20}$ heteroarylalkenyl group, a substituted or unsubstituted $C_3$-$C_{20}$ cycloalkyl group, or a substituted or unsubstituted $C_3$-$C_{20}$ heterocycloalkyl group.

2. The ink composition of claim 1, wherein the disilazane-based compound represented by Formula 1 is selected from the group consisting of hexamethyl disilazane (HMDS) represented by Formula 2 below, 1,3-dibutyl-1,1,3,3-tetramethyl disilazane represented by Formula 3 below, 1,3-di-N-octyltetramethyl disilazane represented by Formula 4 below, 1,1,3,3-tetramethyl disilazane represented by Formula 5 below, 1,3-bis(chloromethyl)tetramethyl disilazane represented by Formula 6 below, 1,3-bis(3,3,3-trifluoropropyl)tetramethyl disilazane represented by Formula 7 below, 1,3-dipropyl-1,1,3,3-tetramethyl disilazane represented by Formula 8 below, and mixtures thereof:

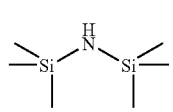

Formula 2

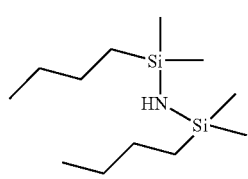

Formula 3

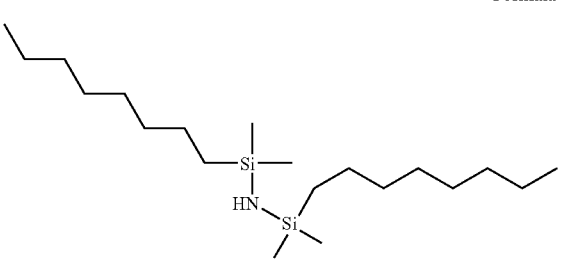

Formula 4

-continued

Formula 5
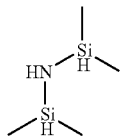

Formula 6
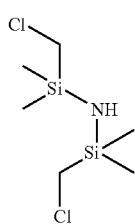

Formula 7
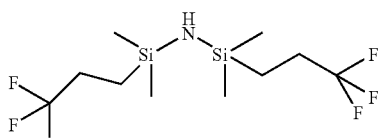

Formula 8
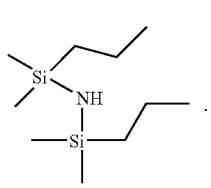

3. The ink composition of claim 1, wherein the content of the disilazane-based compound represented by Formula 1 is about 0.01 to about 10 parts by weight, based on 100 parts by weight of the ink composition.

4. The ink composition of claim 1, wherein the content of the colorant is about 0.5 to about 10 parts by weight, based on 100 parts by weight of the ink composition.

5. The ink composition of claim 1, wherein the content of the solvent is about 80 to about 99 parts by weight, based on 100 parts by weight of the ink composition.

6. The ink composition of claim 1, wherein the solvent is an aqueous solvent, an organic solvent, or a mixture thereof.

7. The ink composition of claim 6, wherein the organic solvent comprises one or more solvents selected from the group consisting of monohydric alcohol based solvents, ketone-based solvents, ester-based solvents, polyalcohol based solvents, nitrogen-containing compound based solvents, and sulfur-containing compound based solvents.

8. The ink composition of claim 6, wherein the solvent comprises about 100 parts by weight of the aqueous solvent and about 0.1 to about 130 parts by weight of the organic solvent based on 100 parts by weight of the ink composition.

9. The ink composition of claim 1, further comprising an additive.

10. The ink composition of claim 9, wherein the additive comprises at least one selected from the group consisting of a wetting agent, a dispersant, a surfactant, a viscosity modifier, a pH controller, and an anti-oxidant.

11. The ink composition of claim 1, wherein the ink composition has a surface tension of about 15-70 dyne/cm at 20° C.

12. The ink composition of claim 1, wherein the ink composition has a viscosity of about 1.0-20 cps at 20° C.

13. An ink set comprising two or more kinds of the ink composition according to claim 1.

14. An ink cartridge for an inkjet recording apparatus, comprising the ink set according to claim 13.

15. An inkjet recording apparatus comprising the ink cartridge according to claim 14.

* * * * *